United States Patent
Draving (10) Patent No.: US 8,223,830 B2
(45) Date of Patent: Jul. 17, 2012

(54) METHOD AND APPARATUS FOR DETERMINING EQUALIZATION COEFFICIENTS

(75) Inventor: Steven D. Draving, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 513 days.

(21) Appl. No.: 12/486,921

(22) Filed: Jun. 18, 2009

(65) Prior Publication Data

US 2010/0322299 A1 Dec. 23, 2010

(51) Int. Cl.
*H03K 5/159* (2006.01)

(52) U.S. Cl. ........ 375/232; 375/229; 375/230; 375/233; 375/316; 375/340; 375/350; 708/300

(58) Field of Classification Search .......... 375/229, 375/230, 232, 233, 316, 340, 350; 708/300
See application file for complete search history.

(56) References Cited

U.S. PATENT DOCUMENTS

| | | | |
|---|---|---|---|
| 6,370,191 B1 * | 4/2002 | Mahant-Shetti et al. | 375/233 |
| 2002/0196877 A1 * | 12/2002 | Matis | 375/346 |
| 2009/0180368 A1 * | 7/2009 | Miyashita et al. | 369/53.35 |

* cited by examiner

*Primary Examiner* — Leon Flores (57) ABSTRACT

A system for filtering a data signal includes an input configured to receive the data signal through a transmission medium and a filter configured to remove distortion from the received data signal using equalization coefficients. The system further includes a processing unit configured to determine dynamically the equalization coefficients of the filter without using a predetermined training pattern in the received data signal.

18 Claims, 6 Drawing Sheets

METHOD AND APPARATUS FOR DETERMINING EQUALIZATION COEFFICIENTS

BACKGROUND

Equalization is an error correction technique to correct for loss caused by cables, wires or other signal transmission media used for communication of serial data. For example, equalization may correct for distortion caused by intersymbol interference (ISI) of high data rate signals within transmission cables connecting various transmitters and receivers within a computer system, such as a mother board chipset, central processing unit (CPU), hard disk drive, memories, peripheral devices, and other components capable of sending and/or receiving data signals.

Feed forward equalization (FFE) is a type of error correction that applies a linear filter to a received signal, and may be implemented as a hardware or software filter. For example, test equipment manufacturers implement FFE filters using a digital finite impulse response (FIR) filter to emulate the equalized signal received by a receiving device in a computer system. Equalizers are characterized by a finite number of equalization coefficients. To be effective, these coefficients need to be optimized to correct for the specific ISI induced upon the transmitted signal by the transmission media.

Determining the optimal equalization coefficients by analyzing distorted signals that have been transmitted from a transmitter to a receiver through the transmission media is called training. Conventional training algorithms require knowledge of the specific bit sequence transmitted during the training process. Normally, the ISI is so severe that the receiver cannot determine the training sequence without first applying the proper equalization. Therefore, the transmitter and receiver use a predetermined periodic bit sequence (i.e., a training pattern), transmitted during the training process, in order to determine equalization coefficients. A cross correlation function may then be used to determine the exact phase of the transmitted bit sequence in the received signal. However, use of a predetermined training pattern increases complexly in the training process, particularly in the case where electronic test equipment is used to emulate the equalization of an actual receiver e.g., within a device under test (DUT).

SUMMARY

In a representative embodiment, a system for filtering a data signal includes an input configured to receive the data signal through a transmission medium and a filter configured to remove distortion from the received data signal using equalization coefficients. The system further includes a processing unit configured to determine dynamically the equalization coefficients of the filter without using a predetermined training pattern in the received data signal.

In another representative embodiment, a method is provided for a test device to implement a filter for correcting distortion of a data signal provided by a device under test (DUT) connected to the test device. The method includes receiving the data signal from the DUT at an input of the test device, the received data signal including intersymbol interference (ISI) induced by at least one transmission medium carrying the data signal; determining a first maximum voltage difference between voltages of the received data signal measured at a first sampling interval; and determining a second maximum voltage difference between voltages of the received data signal measured at a second sampling interval, the second sampling interval being different from the first sampling interval. The method further includes approximating a step response of the ISI based on at least the first and second maximum voltage differences; determining equalization coefficients of the filter based on the approximated step response of the ISI; and implementing the filter to remove the ISI from the received data signal using the equalization coefficients.

In another representative embodiment, a computer readable medium storing a program, executable by a computer, is provided for determining equalization coefficients for filtering a data signal, which includes ISI. The computer readable medium includes a measuring code segment for determining a first maximum voltage difference between voltages of the data signal sampled at a first sampling interval, and for determining a second maximum voltage difference between voltages of the data signal sampled at a second sampling interval different from the first sampling interval. The computer readable medium also includes a step response code segment for approximating a step response of the ISI based on at least the first and second maximum voltage differences, and an equalization coefficient determining code segment for calculating the equalization coefficients based on the approximated step response of the ISI.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such apparatuses and methods are clearly within the scope of the present teachings.

In various embodiments, equalization is performed on serial data signals transmitted through transmission media of a computer system and/or a test device connected to the computer system. Generally, the transmission media effectively act as low pass filters, which attenuate the data signals at higher frequencies.

For example, when a transmitter (e.g., hard disk drive) internal to the computer system sends serial data signals to a receiver (e.g., motherboard chipset) internal to the computer system via a transmission medium (e.g., connecting cable), the receiver performs equalization of the serial data signals, according to embodiments described herein, in order to correct distortion caused by ISI from the transmission medium. Likewise, when a test device, such as an oscilloscope or logic analyzer, is connected to the computer system (or DUT) in order to capture, analyze and/or display the data signals, the test device acts as the receiver of the transmitted data signal, and emulates the equalization error correction with respect to the data signals, as performed by the receiver of the computer system. This equalization error correction is not typically performed on the data signals prior to being received by the test device. Therefore, the data signal received by the test device is distorted by ISI from the computer system's internal transmission media (discussed above) and/or the transmission media connecting the test device to the computer system, such as a coaxial cable. Accordingly, in various embodiments, the test device must perform equalization error correction in order to effectively provide the desired view of a data signal, indicative of the equalized internal data signals of the DUT.

Figure 1:
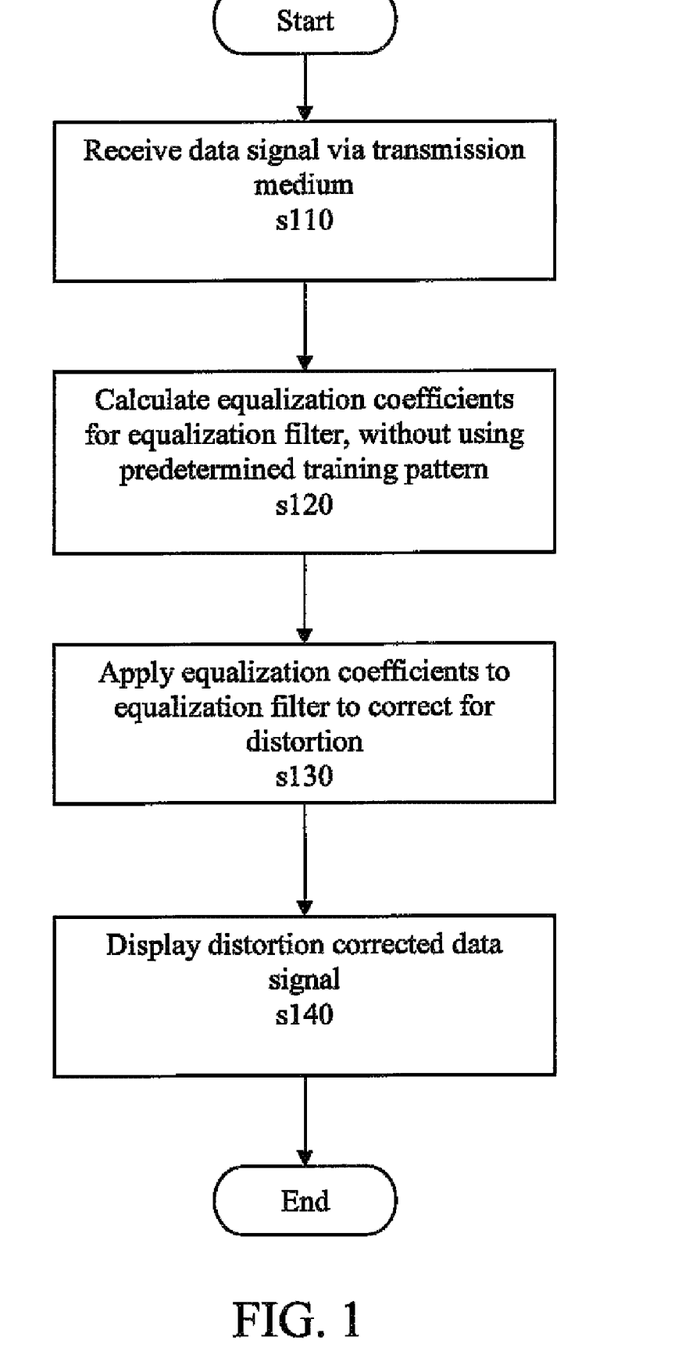
FIG. 1 is a flow diagram of an equalization filtering process, according to a representative embodiment.

FIG. 1 is a flow diagram of the equalization filtering process, according to a representative embodiment.

In block s110 of FIG. 1, a test device (or instrumentation) receives a serial data signal from a DUT (or computer system) that has traveled through a transmission medium, such as a connecting cable. In block s120, the test device emulates equalization performed by the DUT by calculating equalization coefficients for an equalization process, e.g., performed by processing and/or filter units discussed below, that filters the data signal and removes distortion caused by ISI, without using a predetermined training pattern. Generally, the equalization coefficients are determined by sampling the received data signal, effectively consisting of an arbitrary training pattern at different time intervals, in order to approximate a step response of the ISI. An equalization impulse response is calculated based on the approximated ISI step response, through a series of mathematical operations, to compensate for the ISI step response. Calculation of the equalization coefficients is discussed in detail with reference to FIG. 2, according to a representative embodiment. In block s130, the equalization coefficients are applied to an equalization filter to remove the distortion in the data signal. The corrected data signal may then be displayed in block s140. The corrected data signal may also be analyzed and stored, depending on the application.

Figure 2:
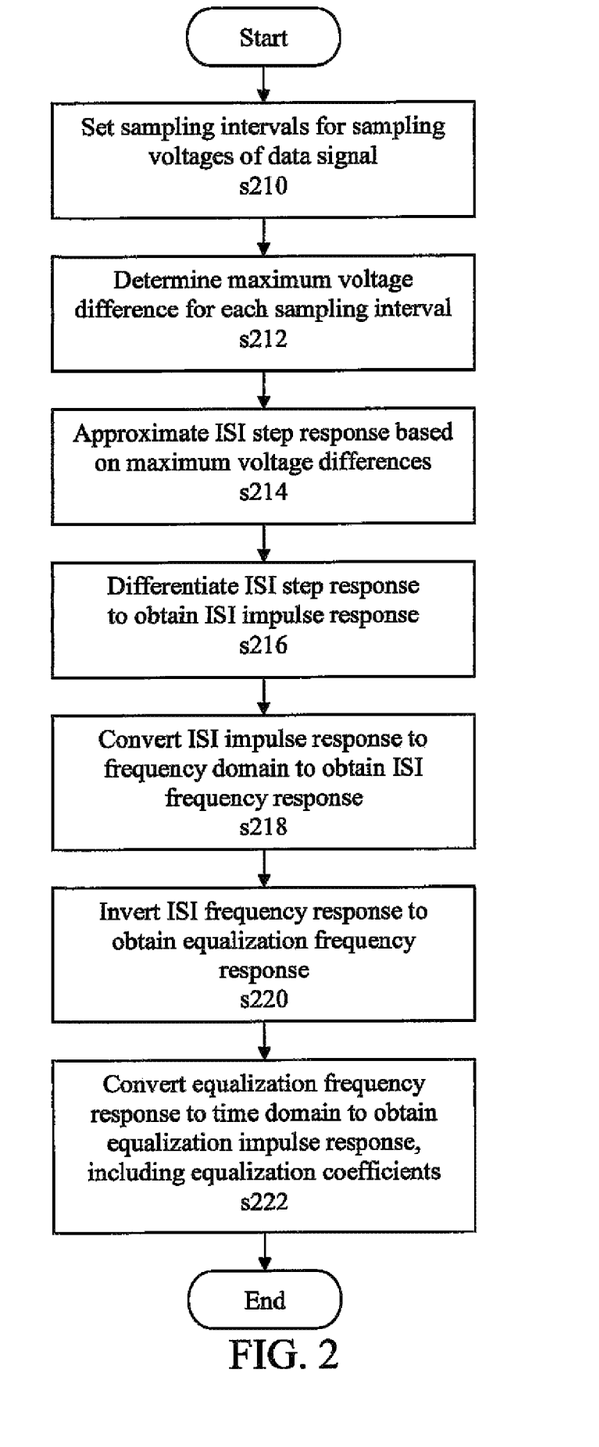
FIG. 2 is a flow diagram of an equalization coefficient determination process for equalization filtering, according to a representative embodiment.

FIG. 2 is a flow diagram of the equalization coefficient determination process, according to a representative embodiment. The process shown in FIG. 2 is performed by a receiver that receives a serial data signal from a transmitter via a transmission medium.

In various embodiments, the receiver may be a component internal to the DUT (or other computer system) that receives the data signal from a transmitter, which is another component internal to the DUT. For example, the receiver may be a motherboard chipset or CPU and the transmitter may be a disk drive or other memory device. In this configuration, the equalization coefficients correct for ISI induced by the transmission medium (e.g., cable) connecting the internal receiver and the internal transmitter.

Alternatively or in addition, the receiver may be an external test device configured to receive the data signal from a transmitter internal to the DUT and, in an embodiment, to emulate the equalization coefficient determination process otherwise performed by a receiver internal to the DUT. For example, the receiver may be in an oscilloscope, a logic analyzer or other test device. In this configuration, the equalization coefficients correct for ISI induced by the transmission medium (e.g., cable) connecting the internal transmitter and the intended internal receiver, and/or for ISI induced by the transmission medium (e.g., coaxial cable) connecting the test device and the DUT.

In blocks s210 and s212 of the depicted embodiment, maximum voltage differences are determined between any two sampled voltages among multiple sampled voltages of the received data signal that are measured at fixed time intervals, referred to as sampling intervals. For example, the maximum voltage difference is the absolute value of the maximum change between two of the sampled voltages of the multiple sampled voltages being sampled at a particular sampling interval.

The sampling intervals are set in block s210, for example, based on the time delay between uniformly spaced equalization coefficients, measured with respect to time-zero of the equalization filter. The time delay between the uniformly spaced coefficients is referred to as "tap delay" for purpose of explanation. In an embodiment, each sampling interval for periodically sampling voltages of the received data signal is equal to the tap delay or an integer multiple of the tap delay. In an embodiment, the tap delay coincides with one clock cycle, or some fraction or integer multiple of one clock cycle, although the length of the tap delay may differ in various embodiments without departing from the scope of the present teachings. For each sampling interval, the sampled voltages are measured and the differences between the measured voltages are determined to identify the maximum voltage difference between any two sampled voltages in block s212. The sampled voltage values and/or the maximum voltage differences for each sampling interval may be stored.

In an embodiment, the number of different sampling intervals is based on the desired number of equalization coefficients to be determined. That is, if the impulse response of the equalization filter is to have N uniformly spaced coefficients $C_n$, then there are N different sampling intervals for measuring maximum voltage differences between sampled voltages of the data signal separated by the sampling intervals, respectively, where N is an integer. For example, to obtain three equalization coefficients, there are three different sampling intervals. In this example, the first sampling interval may be one tap delay, the second sampling interval may be two tap delays and the third sampling interval may be three tap delays in length. Thus, in the first sampling interval, voltages of the data signal are sampled every one tap delay (e.g., corresponding to adjacent bits) to identify the maximum change in voltage between any two of the sampled voltages. In the second sampling interval, voltages of the data signal are sampled every two tap delays (e.g., corresponding to every other bit) to identify the maximum change in voltage between any two of the sampled voltages. In the third sampling interval, voltages of the data signal are sampled every three tap delays (e.g., corresponding to every third bit) to identify the maximum change in voltage between any two of the sampled voltages.

In an alternative embodiment, the equalization coefficients are not uniformly spaced. Rather, the equalization coefficients correspond to different tap delays that are independent (i.e., not multiples) of one another.

Referring again to FIG. 2, in block s214, the maximum voltage differences identified in block s212 are used to approximate a step response of the distortion of the received signal. The distortion includes ISI, for example, resulting from the data signal passing through a transmission medium, discussed above. In order to approximate the ISI step response of the data signal, the maximum voltage differences may be collected into a vector formed by the identified maximum voltage differences. Thus, in the example involving three equalization coefficients, the vector includes three points corresponding to the three measured maximum voltage differences. Accordingly, the first value in the step response vector is set equal to the first sampling interval maximum voltage difference. The second value in the step response vector is set equal to the second sampling interval maximum voltage difference, and so on.

The ISI step response is differentiated in block s216 to obtain a corresponding impulse response of the ISI in the time domain. The ISI impulse response is converted to the frequency domain in block s218, for example, by performing a fast Fourier transform (FFT) on the ISI impulse response.

In block s220, the ISI frequency response is inverted to obtain an equalization frequency response, such that the product of multiplying the resultant equalization frequency response with the ISI frequency response is equal to "1." Thus, the equalization frequency response is the frequency response that produces an equalized data signal that has no (or minimal) distortion caused by ISI. The equalization frequency response is converted from the frequency domain to the time domain in block s222 to provide the equalization impulse response, which provides the equalization coefficients. The equalization frequency response is converted to the time domain, for example, by performing an inverse FFT on the equalization frequency response. As discussed above, the equalization coefficients from the equalization impulse response are used by the equalization filter, which effectively acts as a digital FIR filter, to correct for the ISI distortion in the data signal.

Figure 3:
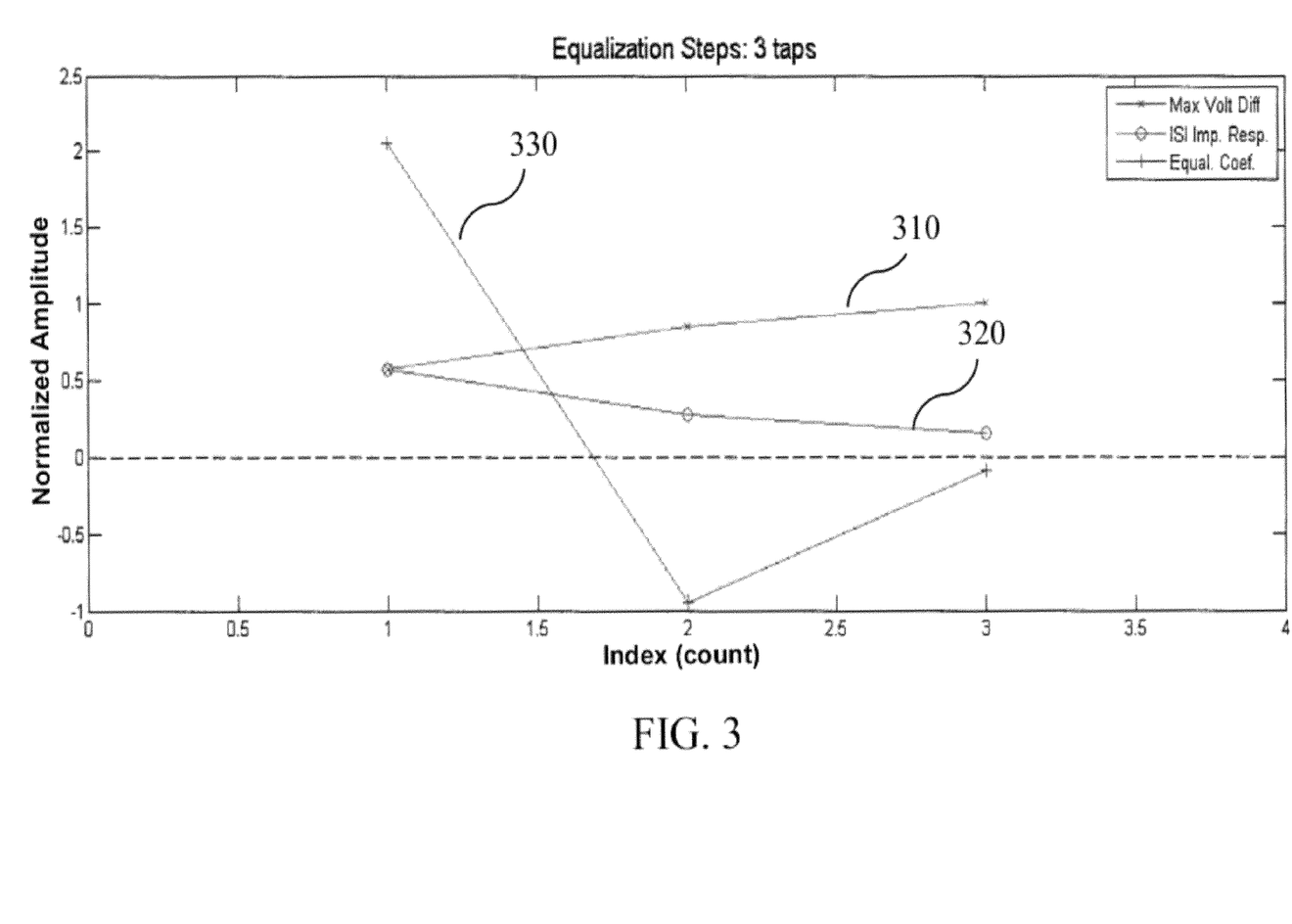
FIG. 3 is a graph showing an equalization coefficient determination process for equalization filtering, according to a representative embodiment.

FIG. 3 is a graph showing the equalization coefficient determination process, according to a representative embodiment.

In particular, FIG. 3 depicts the example in which three equalization coefficients are determined for the equalization filter, where the horizontal axis indicates the index (tap delays), and the vertical axis indicates normalized amplitude. Curve 310 of FIG. 3 depicts a vector defined by the maximum voltage differences among sampled voltages corresponding to each of the three sampling intervals, as discussed above with respect to blocks s210-s212 of FIG. 2. In the depicted example, the first maximum voltage difference is about 0.6 for a first sampling interval of one tap delay, the second maximum voltage difference is about 0.8 for a second sampling interval of two tap delays, and the third maximum voltage difference is about 1.0 for a third sampling interval of three tap delays.

Curve 320 depicts an intermediated vector representing the ISI impulse response in the time domain, which may be calculated by differentiating the ISI step response approximated by the vector defined by the three maximum voltage differences of curve 310, as discussed above with respect to block s216 of FIG. 2. In the depicted example, the ISI impulse response vector is defined by points at about 0.6 at the first tap delay, about 0.3 at the second tap delay and about 0.1 at the third tap delay. Curve 330 depicts the equalization impulse response in the time domain, which may be calculated by performing a FFT on the ISI impulse response to obtain an ISI frequency response, inverting the ISI frequency response to obtain an equalization frequency response, and performing inverse FFT on the equalization frequency response, as discussed above with respect to blocks s218-s222 of FIG. 2. In the depicted example, the equalization impulse response includes a first equalization coefficient of about 2.0 at the first tap delay, a second equalization coefficient of about −1.0 at the second tap delay, and a third equalization coefficient of about −0.1V at the third tap delay.

Figure 4:
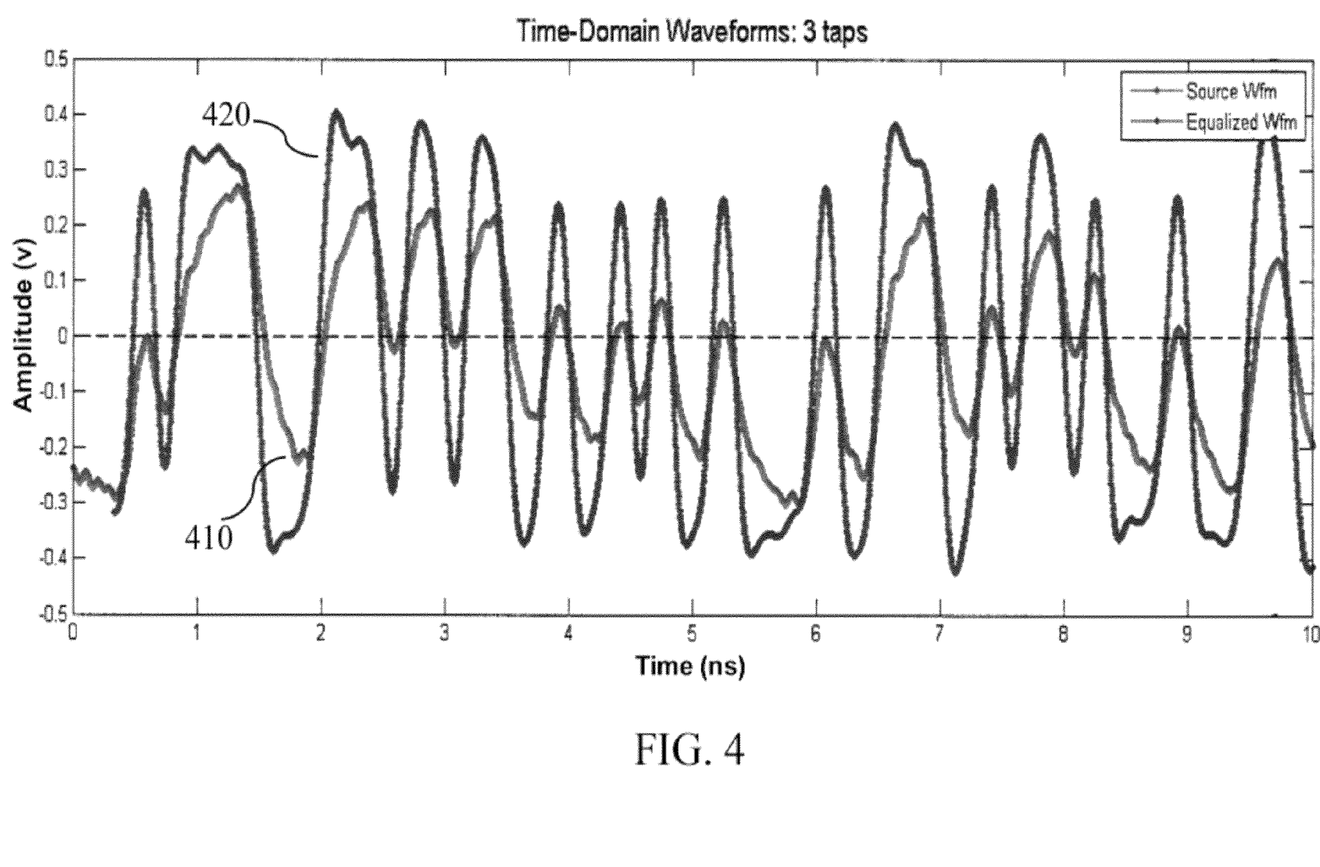
FIG. 4 is a graph showing unfiltered and filtered data signals, according to a representative embodiment.

FIG. 4 is a graph showing waveforms of uncorrected and corrected serial data signals, according to a representative embodiment.

In particular, FIG. 4 depicts the example in which three equalization coefficients are determined for the equalization filter, as discussed above with respect to FIG. 3, where the horizontal axis indicates time in nanoseconds and the vertical axis indicates amplitude in volts. Curve 410 depicts the waveform of the uncorrected data signal, and curve 420 depicts the waveform of the corrected (equalized) data signal. Comparison of curves 410 and 420 shows that the corrected data signal has a significantly improved waveform, e.g., in which the amplitudes of the peaks are pronounced and more evenly distributed about the horizontal axis, thus more clearly indicating "1s" and "0s" of the data signal.

Figure 5:
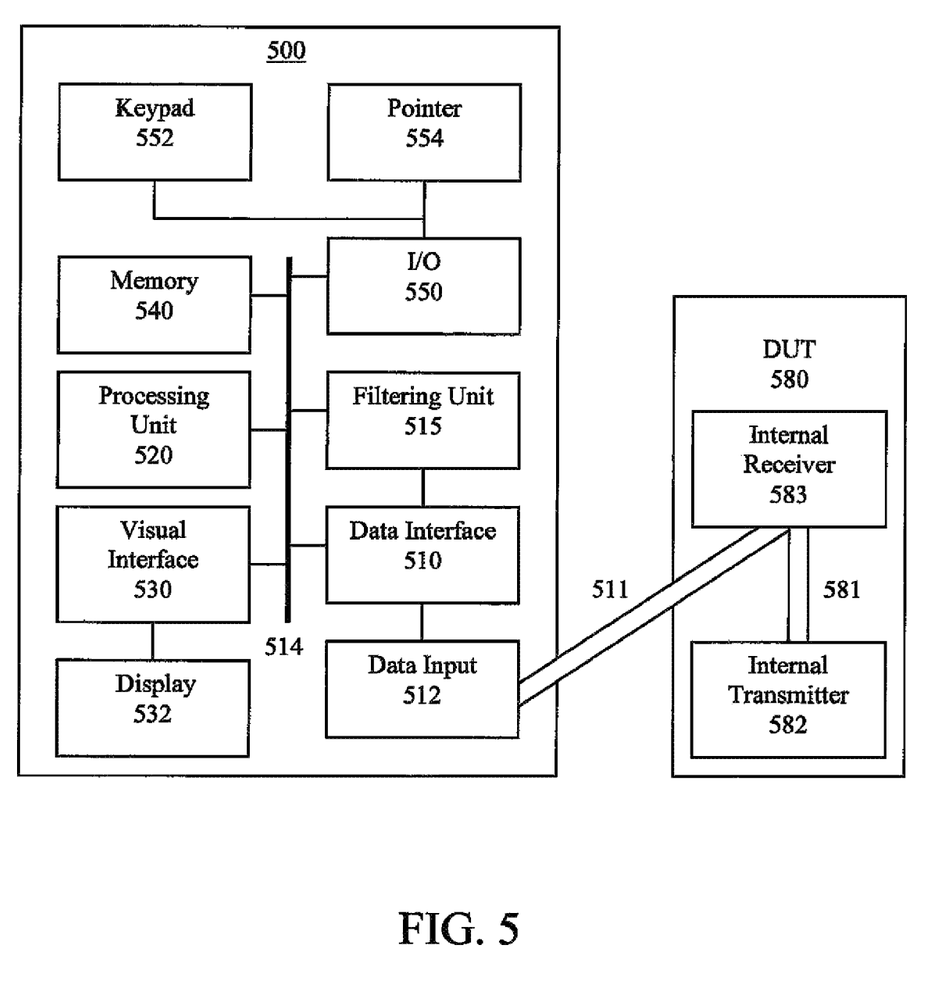
FIG. 5 is a block diagram showing a test device and a device under test, according to a representative embodiment.

FIG. 5 is a block diagram showing test device 500 and a DUT 580, according to representative embodiments. The test device 500 may be any type of instrument for collecting, measuring, processing and/or analyzing various types of data signals. Examples of the test device 500 include oscilloscopes, logic analyzers and the like. The description of the test device 500 also applies to any other type of electronic instrument or computer system that receives and performs equalization filtering of data signals, whether in a test environment or in the course of other data processing, without departing from the scope of the present teachings. The DUT 580 may be any type of computer system configured for transmitting and receiving serial data signals.

The various "parts" shown in the test device 500 may be physically implemented using a software-controlled microprocessor, e.g., processing unit 520, hard-wired logic circuits, firmware, or a combination thereof. Also, while the parts are functionally segregated in the test device 500 for explanation purposes, they may be combined variously in any physical implementation.

In the depicted representative embodiment, the DUT 580 includes a representative internal transmitter 582 and a representative receiver 583, connected by an internal transmission medium 581. As discussed above, the internal transmitter 582 may be a disk drive or other memory device, for example, and the internal receiver 583 may be a motherboard chipset or CPU, for example, having data signal input, processing and filtering capabilities discussed herein. Also, the identity of the internal transmitter 582 and the internal receiver 583 may change dynamically depending on the direction of data signal communications between components. For example, when data is read from a disk drive, the disk drive acts as the internal transmitter 582 and the CPU acts as the internal receiver 583, while when data is written to the disk drive, the CPU acts as the internal transmitter 582 and the disk drive acts as the internal receiver 583. When equalization is performed internal to the DUT 580, the internal receiver 583 performs substantially the same functions discussed below, e.g., with respect to at least processing unit 520 and filtering unit 515.

Also as in the depicted representative embodiment, the test device 500 includes data input 512 and corresponding data interface 510 for receiving data signals from the DUT 580, over a transmission medium 511, such as a coaxial cable. In an embodiment, as shown, the transmission medium 511 is connected to the DUT 580 such that data input 512 receives the data signals after the data signals have traversed the internal transmission medium 581, but before the internal receiver 583 has performed equalization processing on the data signals. Accordingly, equalization performed by the test device may correct for ISI induced by both transmission media 511 and 581. The data input 512 may be any type of input for receiving electronic data signals. The data interface 510 includes an analog-to-digital converter, for example, and is configured to acquire and condition the received data signals.

The received data signals may be provided to various components of the test device 500 through bus 514. For example, the received data signals may be filtered by filtering unit 515 and processed by processing unit 520, as discussed below. Also, the received data signals may be stored in memory 540 and/or displayed on display 532 through display interface 530, at any stage of filtering and processing. The display 532 may be any type of visual display used for showing data signals, including showing the waveforms of filtered and unfiltered data signals, as illustrated in FIG. 4, for example. Depending on the type of instrument and information to be displayed, the local display 532 may be a liquid crystal display (LCD) or a cathode ray tube (CRT) display, for example, although it is understood that any type of display may be incorporated. A user is able to interface with the test device using keypad 552 and/or mouse or pointer 554 through I/O 550.

The memory 540 may be any number, type and combination of nonvolatile read only memory (ROM) and volatile random access memory (RAM), and stores various types of information, such as data signals and/or computer programs and software algorithms executable by the processing unit 520 (and/or other components) to perform the equalization coefficient determination process and equalization filtering control of the embodiments described herein, as well as the basic functionality of the test device 500. The memory 540 may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, tape, a diskette, a floppy disk, and the like. Further, the memory 540 may store results of calculations or summaries performed by the processing unit 520, for example.

The processing unit 520 is configured to execute one or more logical or mathematical algorithms, including the equalization coefficient calculation process of the embodiments described herein, in conjunction with the memory 540, as well as the basic functionality of the test device 500. The processing unit 520 may be constructed of any combination of hardware, firmware or software architectures, and include its own memory (e.g., nonvolatile memory) for storing executable software/firmware executable code that allows it to perform the various functions of the test device 500. Alternatively, the executable code may be stored in designated memory locations within memory 540, discussed above. The processor 520 may execute an operating system, such as Windows operating systems available from Microsoft Corporation, NetWare operating system available from Novell, Inc., or Unix operating system available from Sun Microsystems, Inc. The operating system controls execution of other programs, including data signal processing, equalization coefficient calculation, control of the filtering unit 515, data signal receipt and conditioning through data interface 510, and visual display through visual interface 530, as well as other user and/or device interfaces, such as keypad 552 and/or mouse or pointer 554, through I/O 550.

Figure 6:
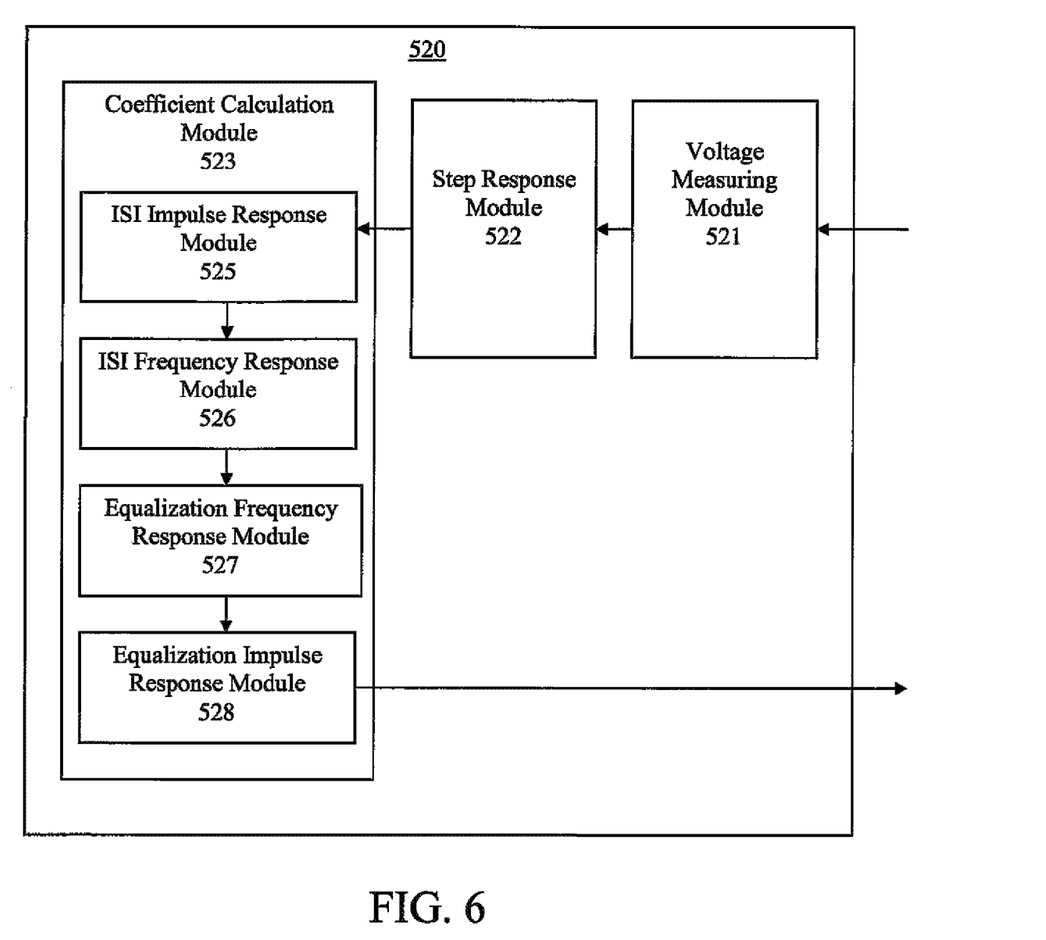
FIG. 6 is a block diagram showing processing modules, according to a representative embodiment.

FIG. 6 is a block diagram illustrating processing modules, according to a representative embodiment.

In the depicted representative embodiment, the processing modules are shown as part of the processing unit 520 for purposes of explanation, and include voltage measuring module 521, step response module 522 and coefficient calculation module 523. The modules may be implemented as any combination of software, hard-wired logic circuits ware and/or firmware configured to perform the designated operations. Software modules, in particular, may include source code written in any of a variety of computing languages, such as C++, C# or MATLAB, and are stored on tangible computer readable storage media, such the computer readable storage media discussed above with respect to memory 540.

The voltage measuring module 521 measures voltage differences between sampled voltages separated by multiple sampling intervals, and determines the maximum voltage difference between the sampled voltages for each sampling interval. As discussed above with respect to blocks s210 and s212 of FIG. 2, the number of sampling intervals is based on the number of equalization coefficients to be determined. Generally, the number of equalization coefficients is less than or equal to the number of different time intervals for periodically sampling the voltages of the data signal. Each sampling interval may be equal to a tap delay or an integer multiple of the tap delay, for example. Alternatively, each sampling interval may have different tap delays that are not integer multiples of one another. The voltage measuring module 521 measures or controls measurement of voltages at the respective time intervals. Based on the measured voltages, the voltage measuring module 521 determines the maximum difference between voltages measured at each of the time intervals. For example, as discussed above, to determine three equalization coefficients, the voltage measuring module 521 implements three sampling intervals, measures voltages in the data signal at each of the three sampling intervals, and determines three maximum voltage differences corresponding to the three sampling intervals, respectively. The sampled voltage values, the maximum voltage differences and/or other information may be stored, for example, in memory 540.

The step response module 522 approximates the step response of the distortion caused by ISI in the received data signal by collecting the maximum voltage differences determined by the voltage measuring module 521 into a vector, as discussed above with respect to step s214 of FIG. 2. An example of the vector approximating the ISI step response is shown by curve 310 of FIG. 3.

The coefficient calculation module 523 calculates the equalization coefficients using the ISI step response approximated by the step response module 522, through a series of mathematical operations, discussed below. In the depicted embodiment, the coefficient calculation module includes ISI impulse response module 525, ISI frequency response module 526, equalization frequency response module 527 and equalization impulse response module 528. In an embodiment, the functionality of the ISI impulse response module 525, the ISI frequency response module 526, the equalization frequency response module 527 and the equalization impulse response module 528 corresponds to blocks s216-s222 of FIG. 2, respectively.

For example, the ISI impulse response module 525 receives the ISI step response approximated by the step response module 522, and determines the ISI impulse response by differentiating the step response. An example of the ISI impulse response is shown by curve 320 of FIG. 3. The ISI frequency response module 526 performs a FFT on the ISI impulse response to obtain the ISI frequency response. The equalization frequency response module 527 inverts the ISI impulse response to obtain the equalization frequency response. The equalization impulse response module 528 performs an inverse FFT on the equalization frequency response to obtain the equalization impulse response, which includes the equalization coefficients. The equalization of the data signal is performed, e.g., by the filtering unit 515, by applying the equalization coefficients of the impulse response, thus effectively implementing a digital FIR filter, without reliance on a predetermined training pattern in the data signal. An example of the equalization coefficients of the equalization frequency response is shown by curve 330 of FIG. 3.

It is understood that the modules and corresponding functionalities shown in FIG. 6 are intended to depict one example of a representative embodiment. The identity and functionality of the modules may differ, without departing from the scope of the present teachings. Likewise, the functionality of the processing modules may be performed, all or in part, by various components of the test device 500, including for example, the processing unit 520, the filtering unit 515 and/or the data interface 510, without departing from the scope of the present teachings. In addition, it is understood that the same functionality discussed with reference to FIG. 6 may be performed, all or in part, by the internal receiver 583 of the DUT 580, for example, when the DUT 580 internally performs equalization according to various embodiments, without departing from the scope of the present teachings.

In view of this disclosure it is noted that variant equalization filters and processing units for determining equalization coefficients and the like can be implemented in keeping with the present teachings. Further, the various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A system for filtering a data signal, the system comprising:
an input configured to receive the data signal through a transmission medium;
a filter configured to remove distortion from the received data signal using equalization coefficients; and
a processing unit configured to determine dynamically the equalization coefficients of the filter without using a predetermined training pattern in the received data signal, wherein the processing unit comprises:
a voltage measuring module configured to periodically sample voltages of the received signal at different time intervals, respectively, and to determine a maximum voltage difference between the sampled voltages for each time interval;
a step response module for approximating a step response of the distortion using a vector formed by the maximum voltage differences; and
a coefficient calculation module for calculating the equalization coefficients based on the approximated step response of the distortion.

2. The system of claim 1, wherein the coefficient calculation module calculating the equalization coefficients comprises:
differentiating the approximated step response to obtain an impulse response of the distortion;
converting the impulse response from time domain to frequency domain to obtain a frequency response of the distortion;
inverting the frequency response of the distortion to obtain an equalization frequency response; and
converting the equalization frequency response from the frequency domain to the time domain to obtain an equalization impulse response, the equalization impulse response comprising the equalization coefficients.

3. The system of claim 1, wherein the number of filter coefficients does not equal the number of different time intervals for periodically sampling the voltages of the received signal.

4. The system of claim 1, wherein each time interval comprises an integer multiple of a clock cycle or a fraction of the clock cycle.

5. The system of claim 1, wherein the step response module approximating the step response of the distortion comprises:
collecting the maximum voltage differences into the vector, the vector comprising the approximated step response of the distortion.

6. The system of claim 1, wherein the transmission medium comprises a cable or other transmission line and the distortion comprises intersymbol interference (ISI).

7. A method for a test device to implement a filter for correcting distortion of a data signal provided by a device under test (DUT) connected to the test device, the method comprising:
receiving the data signal from the DUT at an input of the test device, the received data signal including intersymbol interference (ISI) induced by at least one transmission medium carrying the data signal;
determining a first maximum voltage difference between voltages of the received data signal measured at a first sampling interval;
determining a second maximum voltage difference between voltages of the received data signal measured at a second sampling interval, the second sampling interval being different from the first sampling interval;
approximating a step response of the ISI using a vector formed by at least the first and second maximum voltage differences;
determining equalization coefficients of the filter based on the approximated step response of the ISI; and
implementing the filter to remove the ISI from the received data signal using the equalization coefficients.

8. The method of claim 7, wherein the first sampling interval comprises one clock cycle and the second sampling interval comprises one of an integer multiple of the clock cycle or a fraction of the clock cycle.

9. The method of claim 7, further comprising:
displaying a corrected waveform of the received signal after removing the ISI from the received signal using the equalization coefficients.

10. The method of claim 7, wherein determining the equalization coefficients of the filter based on the approximated step response of the ISI comprises:
determining an impulse response of the ISI using the approximated step response;
determining a frequency response of the ISI using the impulse response;
determining an equalization frequency response using the frequency response of the ISI; and
determining an equalization impulse response using the equalization frequency response, the equalization impulse response comprising the equalization coefficients of the filter.

11. The method of claim 10, wherein determining the impulse response of the ISI comprises differentiating the approximated step response.

12. The method of claim 10, wherein determining the frequency response of the ISI comprises performing a Fourier transform on the impulse response.

13. The method of claim 10, wherein determining the equalization frequency response comprises inverting the frequency response of the ISI.

14. The method of claim 10, wherein determining the equalization impulse response comprises performing an inverse Fourier transform on the equalization frequency response.

15. A non-transitory computer readable medium storing a program, executable by a computer, for determining equalization coefficients for filtering a data signal, which includes intersymbol interference (ISI), the computer readable medium comprising:
- a measuring code segment for determining a first maximum voltage difference between voltages of the data signal sampled at a first sampling interval, and for determining a second maximum voltage difference between voltages of the data signal sampled at a second sampling interval different from the first sampling interval;
- a step response code segment for approximating a step response of the ISI based on at least the first and second maximum voltage differences;
- an impulse response code segment for determining an impulse response of the ISI using the approximated ISI step response;
- a frequency response code segment for determining a frequency response of the ISI using the impulse response;
- an equalization response code segment for determining an equalization frequency response using the frequency response of the ISI; and
- an equalization impulse response code segment for determining an equalization impulse response using the equalization frequency response, the equalization impulse response comprising the equalization coefficients.

16. The non-transitory computer readable medium of claim 15, wherein determining the impulse response of the ISI comprises differentiating the approximated step response, and determining the frequency response of the ISI comprises performing a Fourier transform on the impulse response of the ISI.

17. The non-transitory computer readable medium of claim 15, wherein determining the equalization frequency response comprises inverting the frequency response of the ISI, and determining the equalization impulse response comprises performing an inverse Fourier transform on the equalization frequency response.

18. The non-transitory computer readable medium of claim 15, wherein approximating the ISI step response comprises forming a vector based on at least the first and second maximum voltage differences.

* * * * *